United States Patent [19]

Kato et al.

[11] Patent Number: 4,736,986
[45] Date of Patent: Apr. 12, 1988

[54] SEAT RECLINER ASSEMBLY

[75] Inventors: Yukio Kato, Ayase; Kazuo Horiuchi, Kanagawa; Hideo Ishida, Shizuoka, all of Japan

[73] Assignees: Ikeda Bussan Co., Ltd., Ayase; Hamamatsu Industry Corporation Limited, Hamamatsu, both of Japan

[21] Appl. No.: 915,849

[22] Filed: Oct. 6, 1986

[51] Int. Cl.⁴ .............................................. B60N 1/06
[52] U.S. Cl. .................................... 297/367; 297/362; 297/366; 297/369
[58] Field of Search ................ 297/366, 367, 362, 369, 297/368, 355; 74/435, 437

[56] References Cited

U.S. PATENT DOCUMENTS

| | | | |
|---|---|---|---|
| 2,839,936 | 6/1958 | Dawson | 74/435 X |
| 3,641,838 | 2/1972 | Turner | 297/369 X |
| 3,901,100 | 8/1975 | Iida et al. | 297/367 X |
| 3,973,288 | 8/1976 | Pickles | 297/367 X |
| 3,999,247 | 12/1976 | Cremer | 297/369 X |
| 4,294,488 | 10/1981 | Pickles | 297/367 |
| 4,328,885 | 5/1982 | Zouzoulas | 74/435 X |
| 4,466,661 | 8/1984 | Narita | 297/367 |
| 4,505,515 | 3/1985 | Wilking et al. | 297/362 |
| 4,629,252 | 12/1986 | Myers et al. | 297/366 |
| 4,660,886 | 4/1987 | Terada | 297/369 |

FOREIGN PATENT DOCUMENTS 2829701 1/1980 Fed. Rep. of Germany ...... 297/367

Primary Examiner—James T. McCall
Attorney, Agent, or Firm—Jordan and Hamburg

[57] ABSTRACT

A cam plate is pivotably installed to the base plate by means of the pin, the base plate being to be secured to the lateral side of the seat cushion. The base plate has the toothed member pivotable installed thereon, and the toothed member has formed at the free end thereof a cam striker, concavity formed directed from the cam striker toward the base thereof and a projecting release hook contiguous to the end of the concavity. There is also formed on the cam plate a lock cam which supports the cam striker and also slides into the concavity, and a cut is formed in a portion adjoining the toothed member of the lock cam. There is installed to the toothed member a reverse spring which normally forces the lower teeth in such a direction as to engage the upper teeth. When the cam plate is pivoted in one direction, the opposite walls of the cut depresses the release hook. These walls will retain the release hook when the cam plate pivots in the opposite direction.

1 Claim, 4 Drawing Sheets

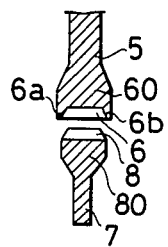
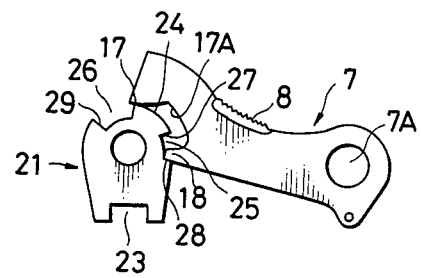
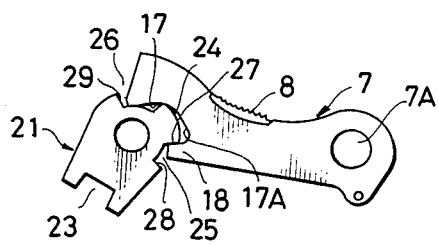

FIG. 7
FIG. 8 (PRIOR ART)
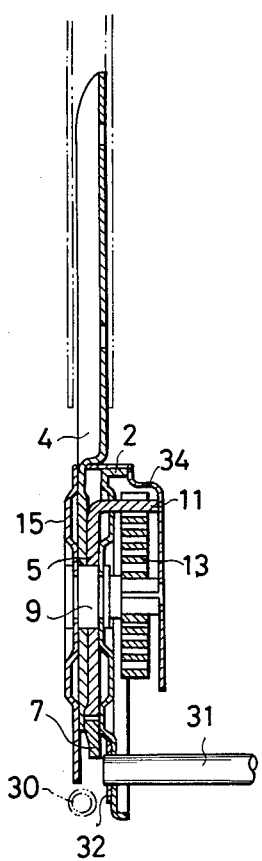
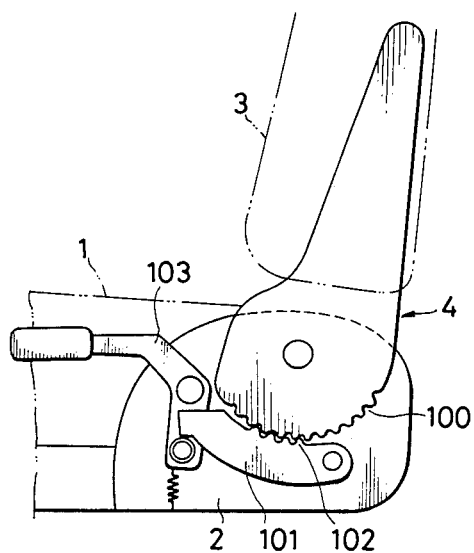
FIG. 9 (PRIOR ART)
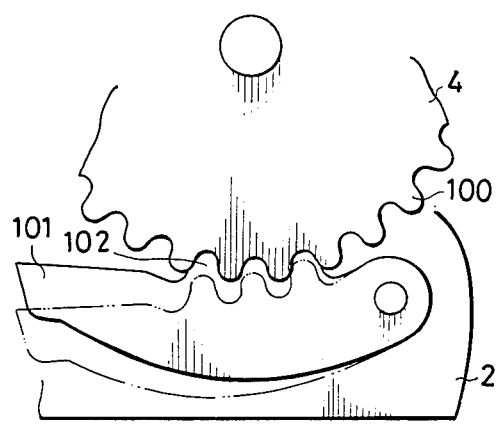
FIG. 10 (PRIOR ART)
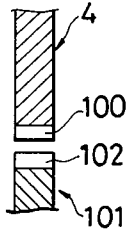

4,736,986

SEAT RECLINER ASSEMBLY

BACKGROUND OF THE INVENTION

1. Field of the Invention

The present invention relates to a seat recliner assembly having a base plate which is to be secured to the lateral side of a seat cushion, an arm to be secured to the lateral side of a seat back and which is pivotably installed at the lower end thereof to the base plate, and an engagement mechanism provided on the arm and base plate and which adjusts the pivoting of the arm, thereby permitting to adjust the tilt angle of the seat back.

2. Description of the Prior Art

Many various seat recliner assemblies have been proposed heretofore. One of the prior-art seat recliner assemblies is constructed as typically shown in FIGS. 8 and 9; the assembly has a base plate 2 to be secured to the lateral side of a seat cushion 1 and an arm 4 to be secured to the lateral side of a seat back 3, the arm being pivotably mounted at the lower end thereof on the base plate 2 and having upper teeth 100 formed at the lower end thereof, the base plate 2 having pivotably installed thereon a toothed member 101 having formed therein lower teeth 102 is engaged with the upper teeth 100, whereby the upper and lower teeth 100 and 102 are put into and out of engagement between them by moving a release lever 103 vertically. The lower end of the arm 4 and the upper edge of the member 101 are toothed as machined by cutting or pressing. The upper and lower teeth 101 and 102 are engaged with each other or disengaged from each other to adjust the tilt angle of the seat back. The engagement teeth had to be sufficiently rigid since the load applied on the seat back 3 concentrates to the engaged teeth. Therefore, the toothed member 101 and arm 4 had to be made of a rather thick steel plate and also the upper teeth 100 at the lower end of the arm 4 and the lower teeth 102 at the upper edge of the member 101 had to have the same thickness of the arm 4 and toothed member 101.

In the prior-art seat recliner assemblies in which the upper teeth 100 and lower teeth 102 are formed in the arm 4 and member 101, respectively, which have to be sufficiently thick, the weight of the arm 4 and toothed member 101 is rather great. If any misalignment exists in the direction of thickness between the upper and lower teeth 100 and 102, these teeth will not possibly be well engaged. To prevent such misaligned engagement between the teeth 100 and 102, they are formed as thick as possible to ensure any, even partially, positive engagement, which is adopted in some of the prior-art seat recliner assemblies that have been proposed. Along with the increased thickness of the teeth 100 and 102, however, the arm 4 and toothed member 101 have to be thick correspondingly, which results in the increased weight of such assemblies.

Also in the prior-art recliner assemblies, when the toothed member 101 is pivoted, the lower teeth 102 and the upper teeth 100 interfere with each other. So the prior-art such assemblies are diadvantageous in that the interfering portions are abraded or broken and that the reclining operation cannot be smoothly done. Especially it cannot be expected that the toothed member 101 can be pivoted positively.

SUMMARY OF THE INVENTION

The present invention has the object of overcoming the above-mentioned drawbacks of the prior art by preventing any engagement misalignment in the direction of thickness of the teeth.

The above object can be attained, according to the present invention, by providing a seat recliner assembly which permits securely pivoting the pivotable member, provide a positive and accurately aligned engagement and also to pivot the toothed member by means of a cam plate, and of which each member can be made a material of an appropriate nature and thickness and which can be easily mahined and is advantageous in precision, rigidity, durability and costs of manufaturing.

According to the present invention, there is also provided a seat recliner assembly comprising a cam plate pivotably installed to the base plate by means of a pin, a cam striker, concavely formed and extending from the cam striker toward the pivoted end and release hook contiguous to the end of the concavity formed at the free-end lower side of the toothed member, a lock cam formed in the cam plate and which supports the cam striker and slides into the concavity, a cut formed in the portion of the lock cam nearer the toothed member, and a reverse spring installed to the toothed member to force the lower teeth so that the lower teeth are normally engaged with the upper teeth, the opposite walls of the cut pushing up the release hook when the cam plate is pivoted in one direction, while it retains the release hook when the cam plate is pivoted in the opposite direction.

These and other objects and advantages of the present invention will be better understood from the ensuing description made by way of example with the reference to the drawings:

BRIEF DESCRIPTION OF THE DRAWINGS

FIG. 2 is a sectional view showing the engaged portion between the upper and lower teeth;

FIG. 3 explains the toothed member in the engaged position by the cam plate;

FIG. 4 explains the disengagement of the toothed member;

FIG. 7 is a sectional view taken along the line VI—VI in FIG. 5;

FIG. 8 is a side elevation of a prior-art seat recliner assembly;

FIG. 9 is explains the engagement of the prior-art assembly; and

FIG. 10 is a sectional view showing the engaged portion of the prior-art assembly.

DETAILED DESCRIPTION OF THE PREFERRED EMBODIMENT

Figure 1:
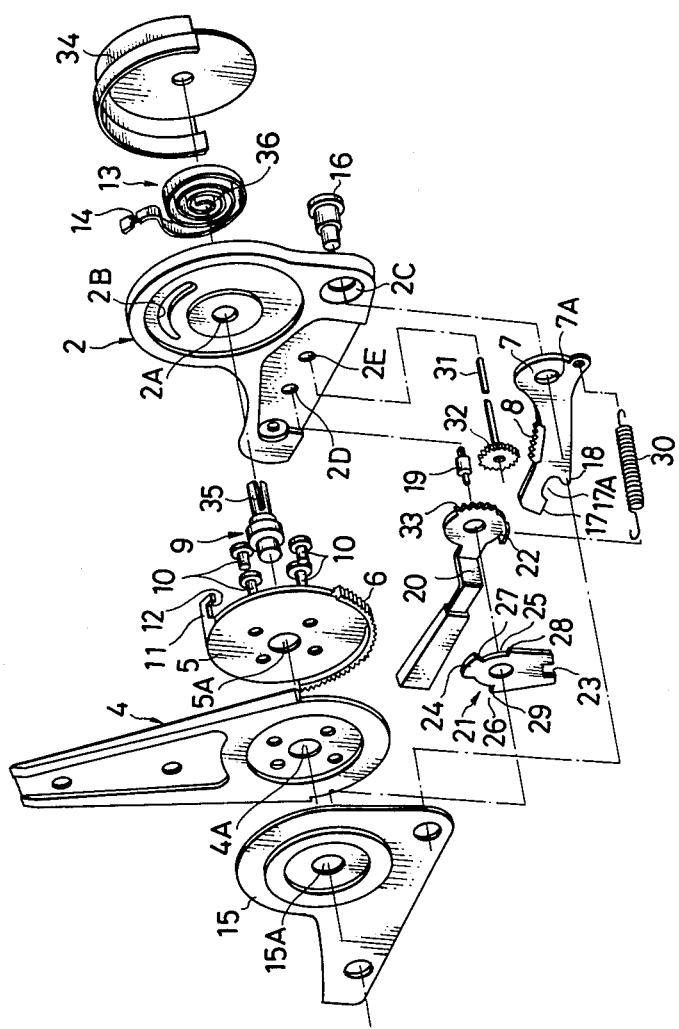
FIG. 1 is an exploded perspective view of an preferred embodiment of the present invention.

Referring now to the drawings, the seat recliner assembly of the invention has a base plate 2 to be secured to the lateral side of a seat cushion 1 and to which an arm 4 to be secured to the lateral side of a seat back 3 is pivotably installed at the lower end thereof. There is also provided an upper toothed member 5 to be installed to the lower end of the arm 4 and which has upper teeth 6 formed in a predetermined portion of the lower-end outer circumference thereof, and a toothed member 7 to be pivotably installed to the base plate 2 having formed in a predetermined portion of the upper end thereof lower teeth 8 which are to be in mesh with the upper teeth 6. The base plate 2 has formed therein a hole 2A in which one end of an arm shaft 9 is inserted. The arm 4 has the upper toothed member 5 secured thereto by means of a plurality of rivets 10. The other end of the arm shaft 9 is inserted through holes 4A and 5A formed in the arm 4 and upper toothed member 5 which are integrally formed. The upper toothed member 5 has a bent portion 11 which slides in an elongated hole 2b formed in the base plate 2. The bent portion 11 has formed therein a cut 12 in which a hook 14 of a return spring 13 is engaged. The hook 14 of the return spring 13 has the opposite sides thereof cut nearer the center. The narrow portion has a nearly same width as the cut 12 in the bent portion 11, and the hook 14 will slide into the cut 12 so that the wide portion at the upper end of the hook 14 is caught at the upper end of the cut 12. The other end of the arm shaft 9 having passed through the hole 4A in the arm 4 and hole 5A in the upper toothed member 5 is riveted after being passed through a hole 15A in a plate holder 15. Therefore, the arm 4 and upper toothed member 5 will be pivotable with respect to the base plate 2 when placed between the base plate 2 and plate holder 15. The base plate 2 has formed at the lower portion thereof a fixing hole 2C in which a collar 16 is fixed as inserted and riveted. The toothed member 7 is pivotably installed at the one end thereof to this collar 16. That is, the hole 7A in the toothed member 7 is fitted onto the collar 16 and pivots around the collar 16. The toothed member 7 has a cam striker 17 formed at the lower portion of the free end thereof, and also a projecting release hook 18 contiguous to the end of a concavity 17A and which is located nearer the middle. A pin 19 has one end thereof riveted in a hole 2D formed in the base plate 2, and a release lever 20 and cam plate 21 are pivotably mounted on this pin 19. A bent portion 22 of the release lever 20 slides into a concavity 23 formed in the lower surface of the cam plate 21 so that the release lever 20 and cam plate 31 move together. Also, the cam plate 21 has formed on the upper surface thereof a lock cam 24 which is located opposite to the cam striker 17 of the toothed member 7, the lock cam being provided to lock the toothed member 7 while the lower teeth 8 are in mesh with the upper teeth 6. That is to say, when the face of the lock cam 24 comes into contact with the face of the cam striker 17, it will raise and hold the free end of toothed member 7, so that the lower tooth 8 is in mesh with the upper teeth 6. Furthermore, the lock cam 24 of the cam plate 21 has cuts 25 and 26 formed at the opposite sides thereof. Side walls 27 and 28 at the opposite sides of the cut 25 function as will be described below. The side wall 27 is located opposite to the upper face of the release hook 25 of the toothed member 7, and when the tilt angle of seat back is adjusted the wall 27 presses the upper face of the release hook 18 to release the engagement between the lower tooth 8 of the toothed member 7 and the upper tooth 6. The side wall 28 is located opposite to the lower face of the release hook 18 to limit the movement of the cam plate 32 since it works as stopper at time of locking. See FIGS. 3 and 4. There is also provided a side wall 29 of the cut 26 spaced from the lock cam 24, and this side wall 29 will work as a stopper to limit the movement of the cam plate 21 at time of unlocking. Furthermore, a release spring 30 is provided between the toothed member 7 and the release lever 20. This spring pulls them in a direction of locking.

In case the same mechanism is provided at either side of a seat, an interlocking shaft 31 is pivotally inserted through the hole 2E in the base plate 2. A gear 32 is secured at either end of the interlocking shaft 31, and the gear 32 is disposed so as to be in mesh with teeth 33 formed on the release lever 20. Therefore, by operating either of the release levers 20 of the seat recliner assemblies provided at opposite sides of the seat, the teeth 33 will pivot the gear 32 and interlocking shaft 31. The other release lever 20 can also be operated as interlocked with the first release lever 20.

A cover 34 is attached outside the base plate 2. This cover 34 is located close to the arm 4, and also it is secured to one end of the arm shaft 9. Note that a cut 35 at one end of the arm shaft 9 encloses a central portion 36 of the return spring 13.

Figure 5:
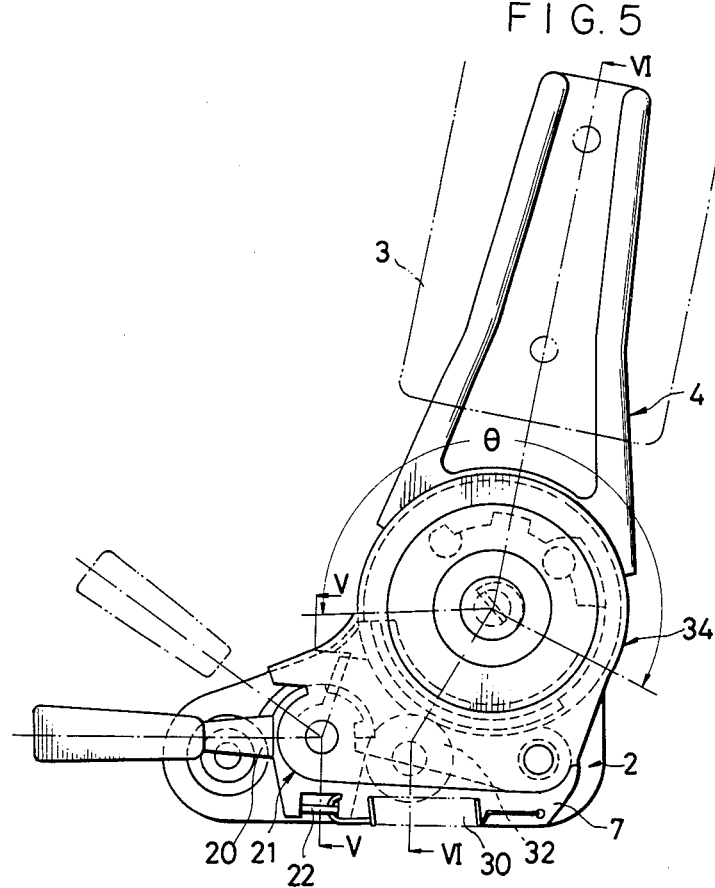
FIG. 5 is a side elevation of the assembled seat recliner when assembled.
Figure 6:
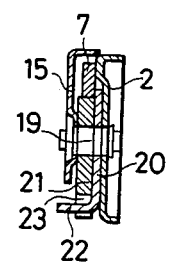
FIG. 6 is a sectional view taken along the line V—V in FIG. 5.

By assembling the mechanism shown in FIG. 1, it will be arranged as shown in FIG. 5. The seat back 3 pivots in the angular range of shown in FIG. 5. The cam plate 21 is assembled as shown in FIG. 6, and the pivotable portion of the arm 24 is assembled as shown in FIG. 7.

It should be noted that the upper teeth 6 and lower teeth 8 are formed by thickening the toothed portions by plastically working the edges of the upper toothed member 5 and the lower toothed member 7. The thickened portions 60 and 80 in which the teeth 6 and 8 are to be formed are formed to a thickness generally same as or less than the thickness of the toothed portions in the prior-art seat recliner assemblies. The thickened portions 60 and 80 are formed simultaneously with the formation of the teeth 6 and 8 by hot gear rolling method. In this hot gear rolling process, the portion to be thickened is heated by high frequency energy, and immediately after the heating, a gear or toothed wheel for gear rolling and which can be in mesh with the tooth 6 or 8 is rolled as pressed on the portion in consideration. Also when the thickened portion 60 or 80 is formed for the teeth 6 or 8, walls 6a and 6b should desirably be formed at the opposite sides oriented in section of the thickness of the tooth 6 or 8. Thanks to such walls 6a and 6b, if, provided the teeth 6 and 8 are prevented from being misaligned in the direction of their thickness.

As described in the foregoing, according to the preferred embodiment of the present invention, the cam plate 21 is also pivoted by means of the bent portion 22 by lifting up the release lever 20. As the cam plate 21 pivots, the lock cam 24 leaves the cam striker 17 of the toothed member 7 and the side wall 29 stops as abutting against the free end of the cam striker 17. As a result, the lower teeth 8 will disengage from the upper teeth 6 so that the side wall 27 will tend to press down the release hook 18. Consequently, the free end of the toothed member 7 will pivot downward. At this time, when the driver or user has adjusted the seat back 3 to a desired tilt angle and then releases the hand from the release lever 20, the toothed member 7 will be lifted up again under the action of the reverse spring 30 so that the lower teeth 8 will be in mesh with the upper teeth 6. At this time, as the lock cam 24 slides from the concavity 17A to the cam striker 17, the engagement between the upper and lower teeth 8 and 6 is corrected as the free end of the toothed member 7 is lifted up. When the side wall 28 abuts against the lower face of the release hook 18 and tends to raise it, the engagement between the teeth 8 and 6 will be securely held. In case the seat back 3 is not provided with any spring force that will act rearward when the release lever 20 is lifted up, the seat back 3 is turned frontward by the spring force of the return or reverse spring 13.

As explained in the foregoing, the seat recliner assembly according to the present invention comprises a cam plate pivotably installed to a base plate by means of a pin; a cam striker, concavity directed from the cam striker toward the base portion and a projecting release hook contiguous to the end of the concavity which all are formed at the free-end lower side of a toothed member a lock cam supporting the cam striker and sliding into the concavity being formed on the cam plate; and a cut formed in a portion adjoining and nearer the toothed member of the lock cam; the opposite walls of the cut depressing the release hook when the cam plate is pivoted in one direction, while the walls will hold the release hook when the cam plate is pivoted in the opposite direction. Thus, this seat recliner assembly in accordance with the invention has an eminent effect as follows. Namely, the pivoting of the cam plate is transmitted to the toothed member, and the side walls of the cut in the cam plate cause the toothed member to pivot downward or upward. Therefore, the cam plate and the means of pivoting this cam plate may be made of materials, suitable for their respective nature and thickness as selected. Also they can be worked individually and relatively easily. Therefore, the present invention is advantageous in view of the precision, rigidity, durability and costs as well. Also, since the reverse spring gives the toothed member a force which causes the member to always pivot in the locking direction, no excessive force will be applied to the cam plate, so the cam plate can move smoothly. Thus the toothed member is correctly operated to provide a positive engagement and disengagement.

What is claimed is:

1. A seat recliner assembly having a base plate adapted to be secured to the lateral side of a seat cushion, an arm adapted to be secured to the lateral side of a seat back and which is pivotably installed at the lower end thereof to the base plate, upper teeth formed on an upper toothed member to be installed to the lower end of the arm, a lower toothed member pivotably installed on the base plate, and lower teeth on the lower toothed member and which are in mesh with the upper teeth, the upper and lower teeth being engageable with, or disengageable from, each other by vertically moving the free end of the toothed member by a release lever, comprising:
   a cam plate pivotably installed to the base plate by means of a pin;
   a cam striker formed at a lower portion of a free end of the lower toothed member;
   a concavity formed at a portion of the lower toothed member contiguous to the cam striker;
   a projecting release hook formed at a portion of the lower toothed member contiguous to an end of the concavity;
   a lock cam formed on an upper surface of the cam plate and which supports the cam striker and is mounted to slide into the concavity of the lower toothed member;
   a cut formed at a portion of the cam plate contiguous to the lock cam and extending between first and second side walls;
   a cut formed at an opposite side of the cam plate as cut and extending between the lock cam and a third side wall;
   a reverse spring between the lower toothed member and the release lever for urging the lock cam to slide from the concavity to the cam striker, the engagement between the upper and lower teeth being reestablished when the free end of the toothed member is lifted up;
   said release lever being pivotably mounted to the pin on which the cam plate is pivoted;
   a bent portion formed on the release lever and which is fitted in a concavity formed in the cam plate so that the release lever and cam plate pivot together;
   said each upper and lower toothed members being comprised of thin plates;
   said each upper and lower teeth comprising thickening of the edges of the thin plates; and
   a wall formed at least one of the opposite sides, oriented in the direction of width, of one of the teeth.

* * * * *